US008740109B2

(12) United States Patent
Muston et al.

(10) Patent No.: US 8,740,109 B2
(45) Date of Patent: Jun. 3, 2014

(54) APPARATUS PRODUCING SUPERHEATED WATER AND /OR STEAM FOR WEED KILLING AND OTHER APPLICATIONS

(75) Inventors: Philip Muston, Yandina (AU); David Parkin, Riverstone (AU); Jeremy Winer, Belrose (AU)

(73) Assignee: Steamwand International Pty Ltd, Belrose, New South Wales (AU)

( * ) Notice: Subject to any disclaimer, the term of this patent is extended or adjusted under 35 U.S.C. 154(b) by 135 days.

(21) Appl. No.: 11/570,294

(22) PCT Filed: Jun. 10, 2004

(86) PCT No.: PCT/AU2004/000769
§ 371 (c)(1),
(2), (4) Date: Dec. 8, 2006

(87) PCT Pub. No.: WO2005/120225
PCT Pub. Date: Dec. 22, 2005

(65) Prior Publication Data
US 2007/0176316 A1   Aug. 2, 2007

(51) Int. Cl.
B05B 1/24 (2006.01)
B05B 9/08 (2006.01)
B05B 1/20 (2006.01)
B05B 1/26 (2006.01)
B05B 1/08 (2006.01)
B05B 1/04 (2006.01)

(52) U.S. Cl.
USPC ............. 239/13; 239/132; 239/159; 239/135; 239/524; 239/154; 239/754; 239/592; 239/589.1; 239/601; 239/499

(58) Field of Classification Search
USPC ............. 239/1, 132, 130, 159, 524, 135, 172, 239/11, 13, 128, 146, 136, 139, 154, 754, 239/589, 592, 601, 589.1, 499; 264/124, 264/125, 126; 126/271.1; 122/39, 1 R; 261/108
See application file for complete search history.

(56) References Cited

U.S. PATENT DOCUMENTS 206,628 A * 7/1878 Simpson ................. 239/130
213,255 A * 3/1879 Simpson ................. 239/130

(Continued)

FOREIGN PATENT DOCUMENTS

| AU | 668291 | 4/1996 |
| AU | 709493 | 8/1999 |
| AU | 721456 | 7/2000 |

OTHER PUBLICATIONS

Derwent Abstract Accession No. 92-141889/18, Class Q72, DD 296337 A (EGGERICHS) Nov. 28, 1991.

(Continued)

Primary Examiner — Len Tran
Assistant Examiner — Steven M Cernoch
(74) Attorney, Agent, or Firm — DiBerardino McGovern IP Group LLC; Andrew F. Bodendorf

(57) ABSTRACT

Apparatus producing superheated water and/or steam for weed (36) killing, etc. has diesel fired boiler (30), which, via pump (32), generates hot water at a pressure of 40-52 bar and temperature of 90-115° C. This passes down tube (12) and encounters the constriction provided by nozzle (14). Passing through nozzle (14) into depressurization chamber (16), which is at atmospheric pressure, the water boils. When the super heated water exits ports (20) of distribution pipe (18) it encounters ambient temperature and is transformed into high temperature water vapor and/or water droplets. The apparatus controls or kill weeds (36) using a smaller volume of water and less energy.

17 Claims, 2 Drawing Sheets

(56) References Cited

U.S. PATENT DOCUMENTS

| | | | |
|---|---|---|---|
| 2,998,924 A * | 9/1961 | Schaeffer | 239/136 |
| 3,917,888 A * | 11/1975 | Beam et al. | 427/433 |
| 4,252,087 A * | 2/1981 | Kime | 122/158 |
| 4,694,990 A * | 9/1987 | Karlsson et al. | 239/81 |
| 4,721,251 A * | 1/1988 | Kondo et al. | 239/412 |
| 5,181,660 A * | 1/1993 | Stouffer et al. | 239/589.1 |
| 5,297,730 A * | 3/1994 | Thompson | 239/13 |
| 5,366,154 A * | 11/1994 | Thompson | 239/13 |
| 5,385,106 A * | 1/1995 | Langshaw | 111/127 |
| 5,430,970 A * | 7/1995 | Thompson et al. | 47/1.5 |
| 5,848,492 A * | 12/1998 | Brown | 47/1.44 |
| 5,867,935 A * | 2/1999 | Brown | 47/1.01 R |
| 5,870,975 A * | 2/1999 | Luc | 122/39 |
| 5,946,851 A * | 9/1999 | Adey et al. | 47/1.5 |
| 6,029,589 A * | 2/2000 | Simpson | 111/7.2 |
| 6,047,900 A * | 4/2000 | Newson et al. | 239/135 |
| 6,073,859 A * | 6/2000 | Gorgens | 239/13 |
| 7,063,281 B2 * | 6/2006 | Schommer | 239/754 |
| RE39,636 E * | 5/2007 | Brown | 47/1.44 |
| 2002/0071710 A1 * | 6/2002 | Vito | 401/266 |
| 2004/0050980 A1 * | 3/2004 | Riha et al. | 239/589.1 |

OTHER PUBLICATIONS

"On-Field Steam Weed Control Equipement", by "Master", Feb. 2003.

* cited by examiner

US 8,740,109 B2

APPARATUS PRODUCING SUPERHEATED WATER AND /OR STEAM FOR WEED KILLING AND OTHER APPLICATIONS

FIELD OF THE INVENTION

This invention relates to improved apparatus for producing superheated water and/or steam. In a particular aspect, it relates to the use of such an apparatus to destroy vegetation, particularly weeds, although other uses, such as cleaning are envisaged.

BACKGROUND OF THE INVENTION

Various methods are known and recognised as being effective for controlling the growth of weeds and other undesirable substances. These methods are used in the agricultural industry and also by state and government bodies such as local councils for keeping paths and other areas free from weeds. Many existing methods involve the application of aqueous solution of chemicals onto the weeds. Recently, the application of chemical weed killers has become less desirable, both from a health and safety point of view in terms of the health of the person applying the chemicals, but also from the point of view of the damage to the environment caused by the use of chemicals.

One known method for killing weeds which does not utilise chemicals, is the application of steam and/or hot water to kill vegetation. U.S. Pat. No. 213,255 (Simpson) for example, discloses an apparatus which uses steam and/or hot water to kill vegetation on railroad beds.

Australian patent application No. 65573/99, entitled "A method of generating a treatment fluid" discloses a method for combining compressed air with heated water at an applicator nozzle.

A number of other patents also describe apparatus for applying heated pressurised water to vegetation including AU 668291 which discloses an apparatus for controlling vegetation by the application of a high pressure water or liquid spray delivering the liquid to a spray tip at a pressure of 100 psi to about 4,000 psi. AU 709493 discloses a method of killing or controlling weeds in which pressurised hot water is applied to weeds of a temperature of 75° C. or above delivered at a pump pressure of in excess of 200 psi and at a flow rate in excess of 4 liters per minute.

However, one major problem with existing hot water and steam applicator and generator means, is that a considerable amount of energy is required to heat the water due to the high specific heat capacity of water and the even higher specific latent heat as water changes from a liquid to a gas, thus the energy consumption of such devices is a major disadvantage of hot water or steam weed control.

An apparatus that was able to control or kill weeds using a smaller volume of water, would not only be more efficient in terms of use of water as a commodity but also more energy efficient.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

In a first aspect of the present invention, there is provided an apparatus for generating superheated hot water and/or steam comprising;

an inlet tube for heated pressured water;
a nozzle constricting flow through the input tube;
a depressurisation chamber; and
means for delivering superheated hot water and/or steam to ambient atmospheric temperature from the depressurisation chamber.

The inlet tube may have a diameter of 8 mm to 25 mm most preferably 10 to 15 mm.

The nozzle may define an aperture in the tube having a diameter of from 0.5 mm to 3 mm, most preferably about 1 mm.

The apparatus may be used with a diesel boiler and a pump to heat and pressurize the water.

The water may be supplied at a temperature of 90 to 150° but typically, water is delivered to the depressurising chamber at a temperature of 100-115° C. and at a pressure of 30 to 100 bar or more, most preferably around 40 to 52 bar.

Typically, the apparatus utilises a diesel fired boiler to heat the water, although other heating means such as LPG could be used.

The apparatus maintains the pressure in the heating, boiler and delivery hose to keep the water exceeding 100° in temperature prior to release of the super heated water to atmosphere where it turns to steam. This allows the delivery of hotter saturated steam than would be possible if the water were not pressurised. The super heated water may be delivered to vegetation at a pressure at in the range of 0 to 99 psi (0 to 6.7 bar) above atmospheric pressure, but most preferably at a pressure in the range of 1 to 10 psi, 0 to 1 bar, approximately above atmospheric pressure. In use, the apparatus typically delivers from 2 to 13 liters of water per minute.

In a related aspect there is provided a method of producing saturated water and/or steam using an apparatus according to the first aspect of the present invention comprising the steps of:

supplying pressurised heated water to the inlet tube at a pressure of 30 to 100 bar and a temperature above 100° C.;

flowing the water past the constricting nozzle into the depressurisation chamber; and delivering superheated hot water and/or steam to ambient atmospheric temperature from the depressurisation chamber.

BRIEF DESCRIPTION OF THE DRAWINGS

Specific embodiments of the present invention will now be described, by way of example only and with reference to the accompanying drawings, in which.

DETAILED DESCRIPTION OF PREFERRED EMBODIMENTS

Figure 1:
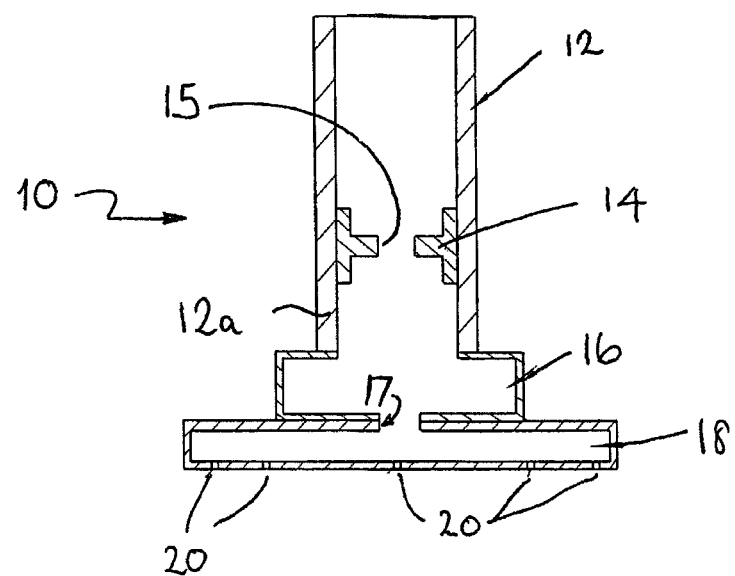
FIG. 1 is a section through a first steam and water applicator head/nozzle.

Referring to the drawings, FIG. 1 shows an applicator head 10 for a steam/water droplet generator for use in killing or controlling vegetation. The application head includes an input feed tube 12 along which superheated water is pumped under pressure from a boiler. Typically the input feed tube 12 is a cylindrical tube having an annular cross section and a 12 mm inside diameter and is manufactured from stainless steel and is capable of operating at water pressures in excess of 150 bar.

Located inside the tube 12, close to one end 12a, is a depressurising/restriction nozzle 14 which constricts flow of water through the tube 12 and helps maintain the pressure between the tube and the boiler. The internal diameter 15 of the nozzle may be varied depending on the desired water flow rate and pressure required. In the specific embodiment, the aperture 15 has a diameter of 1.0 mm, but may vary between 0.5 mm and 3.0 mm.

Adjacent the depressurising nozzle 14, is a depressurising chamber 16 in the form of a rectangular box like chamber having increased diameter relative to the diameter of the input tube 12. The volume of the chamber is not critical as long as it is a larger volume than the volume of the water that the restricting nozzle can release. The chamber may be manufactured from any material which is capable of sustaining water pressures in excess of 52 bar and temperatures of up to 150° C., stainless steel being one suitable material.

An outlet 17 having a size from 2 mm to 10 mm, and being larger than the aperture defines by the nozzle 14, preferably at least twice the diameter, from the depressurising chamber 16 is in fluid communication with a distribution bar or pipe 18. The distribution pipe 18 defines a series of ports or holes 20, having a diameter of 6 mm but which may be varied to suit the volume of water flow required and may typically range from 3 mm to 15 mm in diameter The distribution pipe comprises a hollow cylindrical tube made from a malleable non-corrosive material. The number and size of the delivery holes 20 is matched to suit the water flow ensuring that no back pressure is created. The distribution pipe 18 can be made into any desired shape to suit different applications.

Figure 2:
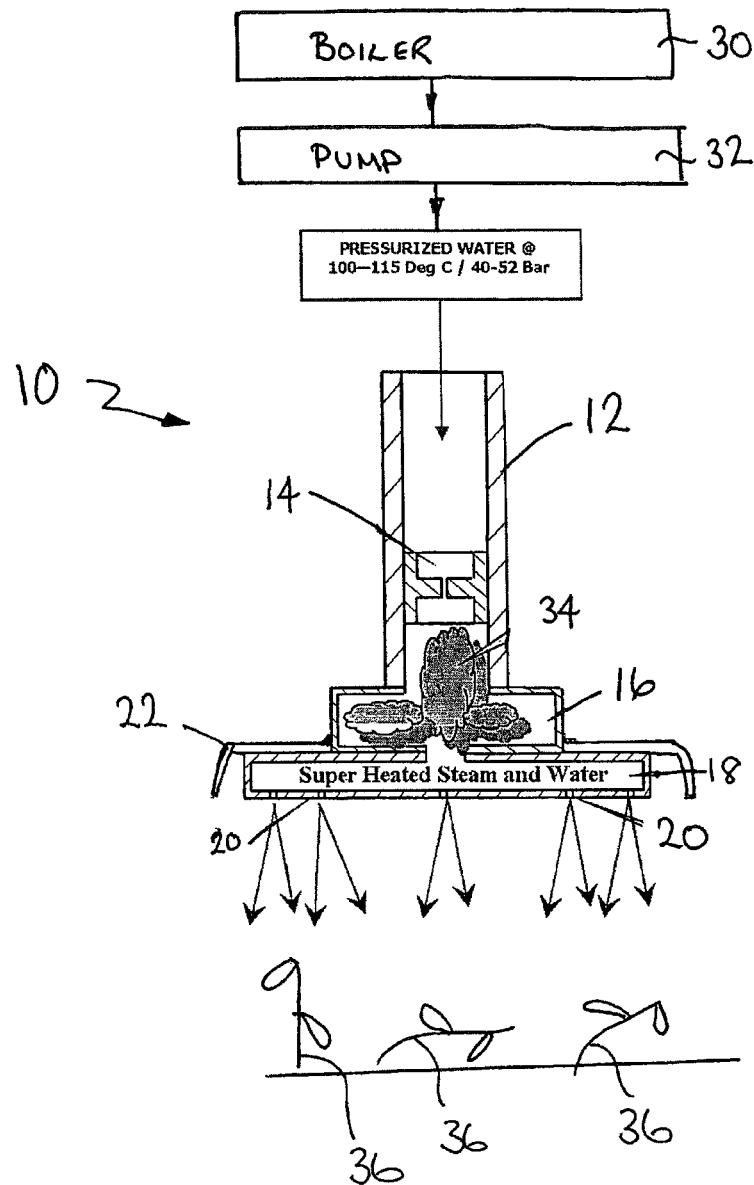
FIG. 2 is a schematic drawing illustrating a steam and water applicator head in use.

Operation of the system will now be described with reference to FIG. 2. A diesel fired boiler 30 and a pump 32 are used to generate pressurized water at a temperature of between 90° to 115° C. and at a pressure of 40 to a 52 bar. At atmospheric pressure, water of that temperature would turn to steam; however, because the water is under pressure, it remains liquid. The water passes down the input feed tube 12 until it reaches the nozzle 14. The water passes through the nozzle 14 and then enters the depressurising chamber 16 where the pressure is approximately ambient atmospheric pressure. As described above, the depressurising nozzle 14 helps maintain the pressure of the water in the input tube at 40 to 52 bar. However, once the water is past the nozzle 14, it enters the depressurising chamber 16 where the pressure reduces to approximately ambient atmospheric pressure. This reduction of the water to ambient atmospheric pressure lowers the boiling point of the water creating water 34 in a superheated condition. When the super heated water exits the ports 20 in the distribution pipe it comes into contact with normal atmospheric temperature and is transformed into a combination of water vapour and water droplets to be applied to weeds 36 to be killed. The distribution pipe is preferably partly covered by an insulating hood 22 for conserving heat and maintaining a superheated environment.

The applicator head can operate effectively delivering water at a rate of anything from 2 liters per minute up to about 13 liters per minute, and typically operates at around 5.5 liters of water per minute. Larger machines which produce higher liters per minute output for use in vineyards or broad acre agriculture are envisage. The provision of the depressurising nozzle 14 and the depressurising chamber allows the delivery of hotter saturated steam 34 than would be possible if the water were not pressurised. However, by depressurising the water prior to application of the super heated steam water 34 to weeds, improves the efficiency of the apparatus and reduces the amount of water required.

The application can be used for weed control in both urban and rural/agricultural environments. It is also envisaged that the apparatus would have applications in the field of cleaning or in other fields it is desired to deliver water vapour and water droplets efficiently.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of killing or controlling vegetation, the method comprising: receiving from a source a superheated pressurized flow of water at a temperature greater than 90° C. and a pressure of 30-100 bar in a conduit transporting the flow; depressurizing the flow of the superheated pressurized water to substantially ambient atmospheric pressure to create a mixture of hot water and saturated steam by receiving the flow in an enclosed space having two restrictions including: a first restriction constricting the flow of superheated pressurized water entering the enclosed space and maintaining pressurization of the flow at 30-100 bar in the conduit between the first restriction and the source, said restriction having a first surface and a second surface, the first surface on a side of the restriction receiving the heated, pressurized flow of water and arranged substantially orthogonal to a side wall of the conduit; the second surface arranged on a side of the restriction opposite the first surface, and an aperture travelling between the first surface and the second surface along an axis between the first surface and the second surface; and a second restriction providing an outlet for any moisture generated by depressurizing flow of superheated pressurized water; and killing or controlling vegetation by delivering the mixture of hot water and saturated steam from the outlet to the vegetation.

2. A method as claimed in claim 1, wherein the first restriction has a diameter of from 0.5 mm to 3.0 mm.

3. A method as claimed in claim 1, wherein receiving a superheated pressurized flow of water at a temperature greater than 90° C. and a pressure of 30-100 bar includes receiving the flow at a pressure of 40 to 52 bar.

4. A method as claimed in claim 1, wherein receiving a superheated pressurized flow of water at a temperature greater than 90° C. and a pressure of 30-100 bar includes receiving the flow at a temperature of 100° C. to 150° C.

5. A method as claimed in claim 1, wherein receiving a superheated pressurized flow of water at a temperature greater than 90° C. and a pressure of 30-100 bar includes receiving the flow at a rate of between 2 liters per minute to 13 liters per minute.

6. A method as claimed in claim 1, wherein delivering the mixture of hot water and saturated steam to the vegetation includes delivering the mixture at a pressure in the range of 0 to 1 bar above atmospheric pressure.

7. The method of claim 1 wherein the outlet has a diameter of 2 mm to 10 mm.

8. The method of claim 1 wherein the outlet has an area greater than the area of the first restriction.

9. The method of claim 1 wherein the outlet has an area at least twice the area of the first restriction.

10. The method of claim 1 wherein the volume of the enclosed space is larger than the volume of the flow of water from the first restriction.

11. An apparatus for killing or controlling vegetation, comprising: an inlet tube receiving a superheated pressurized flow of water at a temperature greater than 100° C. and a pressure of 30-100 bar from a source; a restriction defining an aperture that constricts the superheated pressurized flow of water in the inlet tube and maintains pressurization of the flow in the inlet tube between the source and the aperture at the pressure of 30-100 bar, said restriction having a first surface and a second surface, the first surface on a side of the restriction receiving the heated, pressurized flow of water and arranged substantially orthogonal to a side wall of the inlet tube; the second surface arranged on an side of the restriction opposite the first surface, and an aperture travelling between the first surface and the second surface along an axis between the first surface and the second surface; an expansion chamber in direct fluid communication with said restriction receiving the flow of superheated pressurized water from the inlet tube through the restriction and into the expansion chamber to depressurize the flow of superheated pressurized water to substantially ambient atmospheric pressure and generate a mixture of hot water and saturated steam in the expansion chamber as a result of said depressurization, the expansion chamber having only a single outlet through which moisture can exit the enclosed space; and a distributor, in direct fluid communication with the outlet, receiving the mixture of hot water and saturated steam from the expansion chamber, the distributor including a plurality of delivery holes delivering the mixture of hot water and saturated steam from the delivery holes to vegetation to kill or control the vegetation.

12. A method of killing or controlling vegetation, the method comprising: receiving in an inlet tube a flow of water heated by a boiler to a temperature greater than 100° C. and pressurized by a pump to a pressure of 30-100 bar within the inlet tube; constricting by a nozzle the heated, pressurized flow of water received in said inlet tube, said nozzle having a first surface and a second surface, the first surface on a side of the nozzle receiving the heated, pressurized flow of water and arranged substantially orthogonal to a side wall of the inlet tube; the second surface arranged on a side of the nozzle opposite the first surface, and an aperture travelling between the first surface and the second surface along an axis between the first surface and the second surface, said aperture of a size and a shape allowing said heated, pressurized flow to pass through the aperture while causing the temperature of the flow at the aperture to remain greater than 100° C. and the pressurization of the heated pressurized flow in the inlet tube between the pump and the aperture to be maintained at a pressure of 30-100 bar; depressurizing and cooling the heated, pressurized flow received from said aperture in an expansion chamber to substantially ambient atmospheric pressure, said depressurization and cooling of the heated, pressurized flow in said expansion chamber creating a mixture of hot water and saturated steam, said expansion chamber sized to receive said flow and provide said depressurization and cooling to create the mixture and having only a single outlet through which moisture can exit the expansion chamber; and killing or controlling vegetation by receiving the mixture of hot water and saturated steam from the expansion chamber in a distributor, in direct fluid communication with the outlet, the distributor delivering the mixture of hot water and saturated steam onto the vegetation.

13. The apparatus of claim 12, wherein constricting by a nozzle, further includes constriction by a nozzle wherein the first surface and the second surface are substantially planar to each other and arranged orthogonal to the side wall of the inlet tube; and the aperture travelling between the first surface and the second surface along the axis is arranged substantially orthogonal to the first surface and the second surface and substantially parallel to the side wall of the inlet tube.

14. An apparatus for killing or controlling vegetation, the apparatus comprising: an inlet tube receiving a flow of water heated by a boiler to a temperature greater than 100° C. and pressurized by a pump to a pressure of 30-100 bar within the inlet tube; a nozzle constricting the heated, pressurized flow of water received in said inlet tube, said nozzle having a first surface and a second surface, the first surface on a side of the nozzle receiving the heated, pressurized flow of water and arranged substantially orthogonal to a side wall of the inlet tube; the second surface arranged on a side of the nozzle opposite the first surface, and an aperture travelling between the first surface and the second surface along an axis between the first surface and the second surface, said aperture of a size and a shape allowing said heated, pressurized flow to pass through the aperture while causing the temperature of the flow in the inlet tube at the aperture to remain greater than 100° C. and maintaining pressurization of the heated pressurized flow in the inlet tube between the pump and the aperture at a pressure of 30-100 bar; an expansion chamber in fluid communication with said aperture depressurizing and cooling the heated, pressurized flow received from said aperture to substantially ambient atmospheric pressure to create a mixture of hot water and saturated steam, said expansion chamber having dimensions to receive said flow a provide said depressurization and cooling to create the mixture and having only a single outlet through which moisture can exit the expansion chamber; and a distributer receiving the mixture of hot water and saturated steam from the single outlet and delivering the mixture of hot water and saturated steam onto the vegetation to kill or control the vegetation.

15. The apparatus of claim 14, wherein the first surface and the second surface are substantially parallel to each other and arranged orthogonal to the side wall of the inlet tube; and the aperture travelling between the first surface and the second surface along the axis is arranged substantially orthogonal to the first surface and the second surface and substantially parallel to the side wall of the inlet tube.

16. An system for killing or controlling vegetation, the system comprising: a boiler heating water to a temperature greater than 100° C.; a pump receiving the heated water and pressurizing the heated water to a pressure of 30-100 bar; an inlet tube transporting a flow of the heated, pressurized water received from the pump; a nozzle constricting the heated, pressurized flow of water received in said inlet tube, said nozzle having a first surface and a second surface, the first surface on a side of the nozzle receiving the heated, pressurized flow of water and arranged substantially orthogonal to a side wall of the inlet tube; the second surface arranged on an opposite side of the nozzle, and an aperture travelling between the first surface and the second surface along an axis between the first surface and the second surface, said aperture of a size and a shape allowing said heated, pressurized flow to pass through the aperture while causing the temperature of the flow in the inlet tube at the aperture to remain greater than 100° C. and maintaining pressurization of the heated pressurized flow in the inlet tube between the pump and the aperture at a pressure of 30-100 bar; an expansion chamber in fluid communication with said aperture depressurizing and cooling the heated, pressurized flow received from said aperture to substantially ambient atmospheric pressure to create a mixture of hot water and saturated steam as a result of the depressurization, said expansion chamber having dimensions to receive said flow and provide said depressurization and cooling to create the mixture and having only a single outlet through which moisture can exit the expansion chamber; and a distributer receiving the mixture of hot water and saturated steam from the single outlet and delivering the mixture of hot water and saturated steam onto the vegetation to kill or control the vegetation.

17. The system of claim 16, wherein the first surface and the second surface are substantially parallel to each other and arranged orthogonal to the side wall of the inlet tube; and the aperture travelling between the first surface and the second surface along the axis is arranged substantially orthogonal to the first surface and the second surface and substantially parallel to the side wall of the inlet tube.

\* \* \* \* \*